(12) United States Patent
Rothschild

(10) Patent No.: US 10,187,004 B2
(45) Date of Patent: Jan. 22, 2019

(54) SLIDE-ON SPRING CLIP FOR INSTALLING SOLAR PANELS AND METHOD OF USE

(71) Applicant: Elie Rothschild, San Francisco, CA (US)

(72) Inventor: Elie Rothschild, San Francisco, CA (US)

( * ) Notice: Subject to any disclaimer, the term of this patent is extended or adjusted under 35 U.S.C. 154(b) by 182 days.

(21) Appl. No.: 15/097,684

(22) Filed: Apr. 13, 2016

(65) Prior Publication Data

US 2017/0302219 A1    Oct. 19, 2017

(51) Int. Cl.
| | | |
|---|---|---|
| *H02S 20/20* | (2014.01) | |
| *H02S 20/23* | (2014.01) | |
| *F24S 25/11* | (2018.01) | |
| *F24S 25/61* | (2018.01) | |
| *F16B 5/06* | (2006.01) | |
| *F16B 2/24* | (2006.01) | |
| *F24S 25/613* | (2018.01) | |
| *F24S 25/60* | (2018.01) | |

(52) U.S. Cl.
CPC .............. *H02S 20/20* (2014.12); *F16B 2/245* (2013.01); *F16B 5/0635* (2013.01); *F24S 25/11* (2018.05); *F24S 25/613* (2018.05); *F24S 2025/6004* (2018.05); *Y10T 29/49947* (2015.01)

(58) Field of Classification Search
CPC ........ H02S 20/20; H02S 20/23; F24S 25/613; F24S 25/11; F24S 2025/6004; F16B 5/0635; F16B 2/245; Y10T 29/49947
USPC ................. 29/525.01; 248/237, 536, 229.16, 248/229.26, 228.7, 231.81
See application file for complete search history.

(56) References Cited

U.S. PATENT DOCUMENTS

| | | | | |
|---|---|---|---|---|
| 4,331,492 A | * | 5/1982 | Dominguez | H01L 31/048 136/251 |
| 5,451,167 A | * | 9/1995 | Zielinski | H01R 4/245 439/435 |
| 5,653,414 A | * | 8/1997 | Chimel | B60R 7/082 248/316.7 |
| 6,467,742 B1 | * | 10/2002 | Pitcher | A47G 1/0611 248/205.3 |
| 8,382,513 B2 | * | 2/2013 | Kobayashi | F24J 2/5207 439/507 |
| 8,418,983 B2 | * | 4/2013 | Hartelius | F24J 2/5232 211/41.1 |
| 8,732,917 B2 | * | 5/2014 | Zeilenga | F24J 2/5249 24/514 |

(Continued)

*Primary Examiner* — Bayan Salone
(74) *Attorney, Agent, or Firm* — Mark David Torche; Patwrite Law

(57) ABSTRACT

A slide-on spring clamp for installing solar panels has a slide portion with a centrally located slot. The slot is used to attach the slide-on clamp to a solar panel mounting base using an attachment bolt that allows the installer to locate and secure a solar panel frame from the top without having to access the underside. The slide-on clamp has a clamp portion that has a reverse curve portion that curves back over itself to form a resilient gripping portion. The reverse curve portion has locking teeth located on the interior surfaces that lock the frame in place when inserted in the slide-on clamp. A stop portion is disposed the end of the slide portion. The method includes inserting a slide-on clamp on opposite sides of the frame so that the frame has at least four slide-on clamps thereon and then securing them to the mounting bases.

5 Claims, 5 Drawing Sheets

(56) References Cited

U.S. PATENT DOCUMENTS

| | | | | |
|---|---|---|---|---|
| 8,839,573 B2* | 9/2014 | Cusson | ............. | F24J 2/5232 |
| | | | | 248/231.81 |
| 8,894,033 B2* | 11/2014 | Hartelius | ............. | F24J 2/5232 |
| | | | | 211/41.1 |
| 9,147,785 B2* | 9/2015 | Haddock | ............. | H02S 20/00 |
| 9,249,925 B2* | 2/2016 | Roensch | ............. | H01L 31/042 |
| 9,316,416 B2* | 4/2016 | Poulakis | ............. | E04C 2/20 |
| 2011/0072631 A1* | 3/2011 | Hartelius | ............. | F24J 2/5232 |
| | | | | 29/428 |
| 2012/0223032 A1* | 9/2012 | Rothschild | ............. | H02S 20/00 |
| | | | | 211/41.1 |
| 2015/0014496 A1* | 1/2015 | Roensch | ............. | H01L 31/042 |
| | | | | 248/201 |
| 2016/0043687 A1* | 2/2016 | McPheeters | ............. | H02S 20/30 |
| | | | | 211/162 |

* cited by examiner

SLIDE-ON SPRING CLIP FOR INSTALLING SOLAR PANELS AND METHOD OF USE

BACKGROUND OF THE INVENTION

As alternative energy sources become more important to the economic and environmental well-being of society, solar energy use will continue to increase. It is becoming more common to see roofs and other structures having solar panels installed to generate electrical energy.

Many solar panel installations use mounting structures to clamp to the frame of the solar panels to be installed. Generally, retaining fasteners such as bolts are used to attach the panels to the mounting structures. Often it is difficult to accomplish this because it is necessary to have access to both sides of the fasteners and this is not always easy. It is known to use bolts that are pre-fastened but this can make installation can be difficult since all mounting holes must be precisely lined up.

There is a need for an easy to use solar panel mounting system that allows the installer to install from a top exposed side only without requiring precise locating preassembly.

SUMMARY OF THE INVENTION

A slide-on spring clamp for installing solar panels has a slide portion with a centrally located slot. The slot is used to attach the slide-on clamp to a solar panel mounting base using an attachment bolt that allows the installer to locate and secure a solar panel frame from the top without having to access the underside. The slide-on clamp has a clamp portion that has a reverse curve portion that curves back over itself to form a resilient gripping portion. The reverse curve portion has locking teeth located on the interior surfaces that lock the frame in place when inserted in the slide-on clamp. A stop portion is disposed the end of the slide portion. The method includes inserting a slide-on clamp on opposite sides of the frame so that the frame has at least four slide-on clamps thereon and then securing them to the mounting bases.

Other features and advantages of the instant invention will become apparent from the following description of the invention which refers to the accompanying drawings.

DETAILED DESCRIPTION OF THE INVENTION

Figure 1:
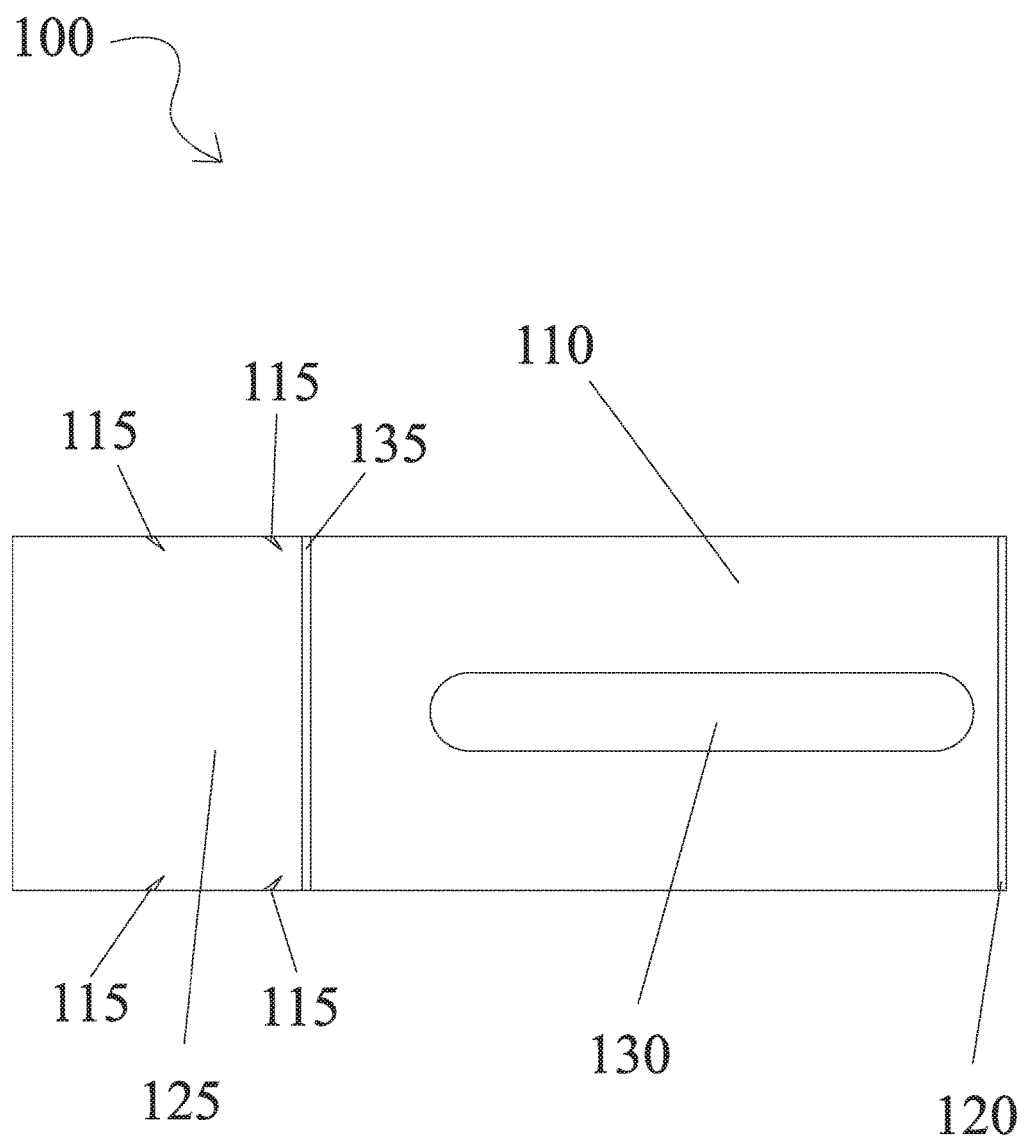
FIG. 1 is a top view of a slide-on spring clip for installing solar panels according to an embodiment of the invention.
Figure 2:
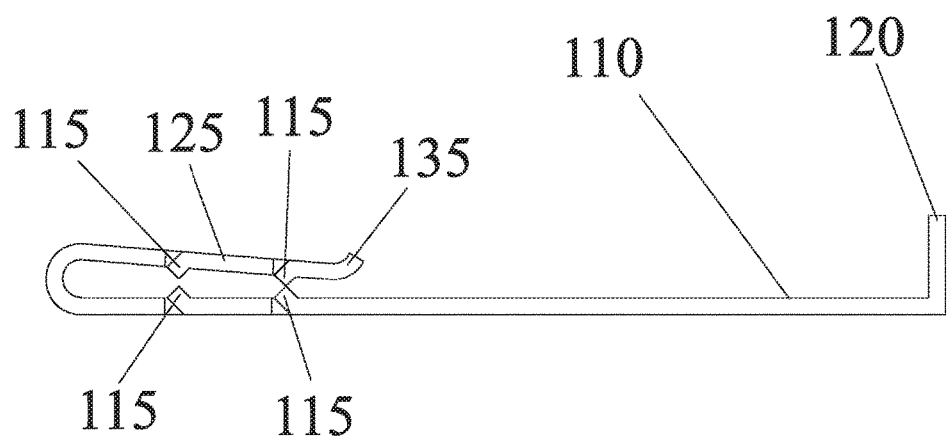
FIG. 2 is a side view of the slide-on spring clip for installing solar panels shown in FIG. 1.
Figure 3:
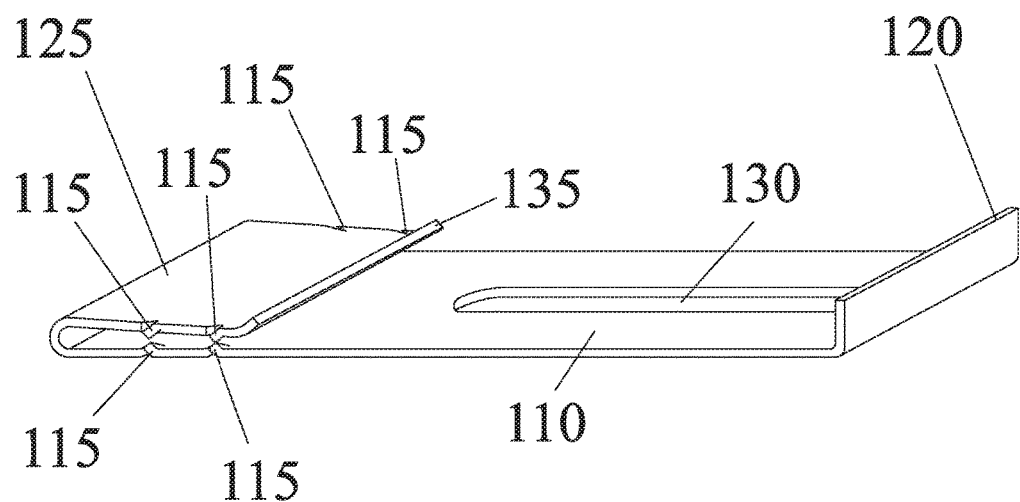
FIG. 3 is a perspective view of the slide-on spring clip for installing solar panels shown in FIG. 1.
Figure 4:
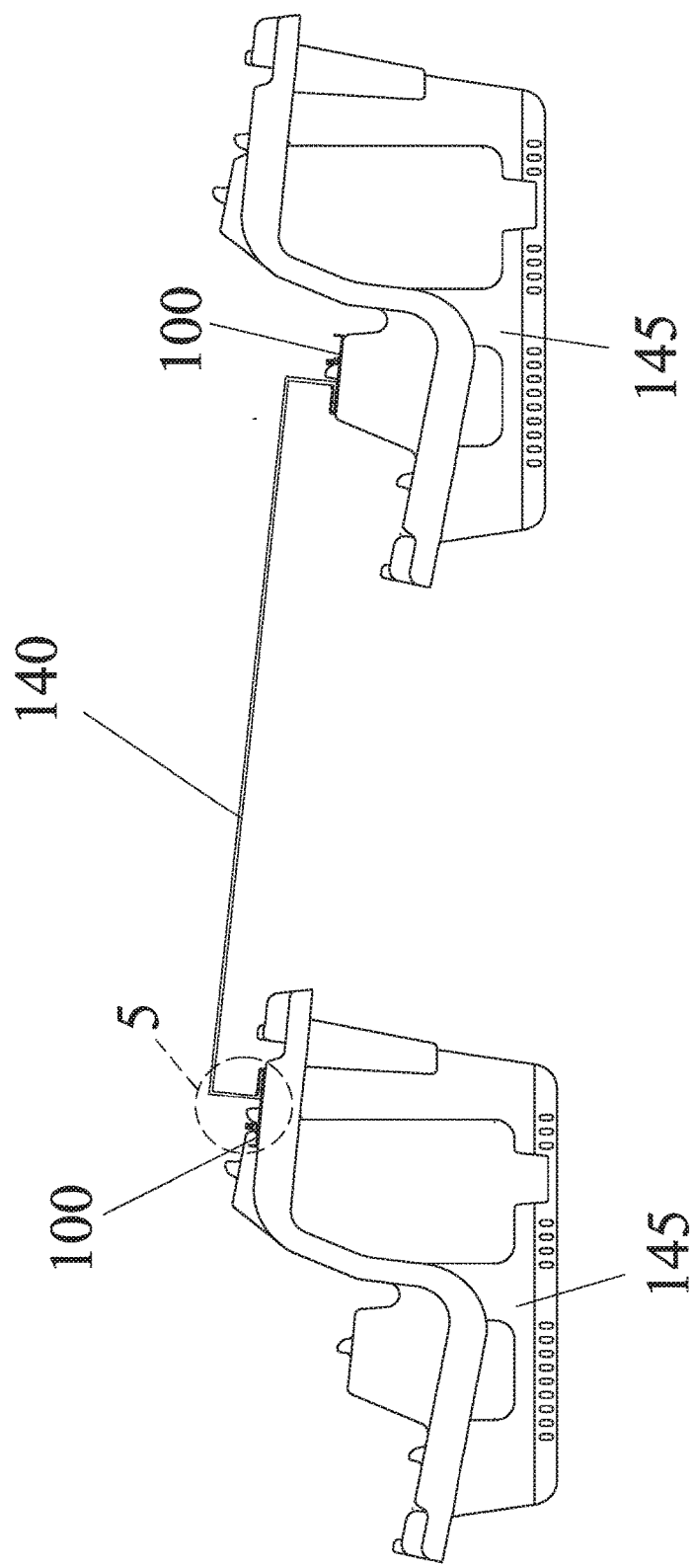
FIG. 4 is a side view of a typical installation using slide-on clips for installing solar panels according to an embodiment of the invention.
Figure 5:
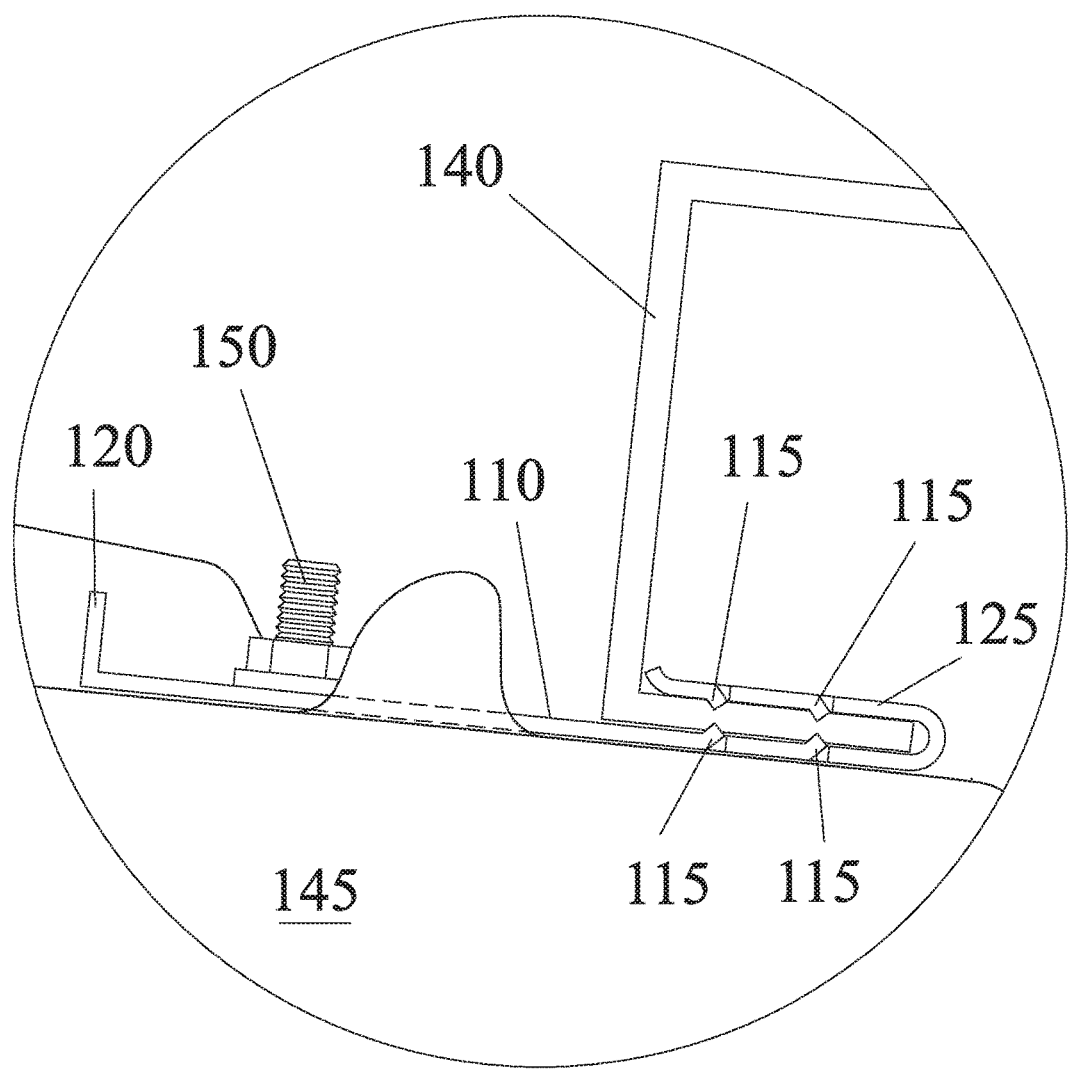
FIG. 5 is a close up view of the view shown in typical installation shown in FIG. 4.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to the figures, a slide-on spring clip for installing solar panels 100 is shown having a slide portion 110 with a slot 130 used to position a solar panel frame 140. Slide-on clip 100 has a clamp portion 125 that resiliently provides a retaining force when forced apart. Clamp portion 125 is a reverse curve portion that makes an angle of more than 180 degrees with respect to a lower portion of clamp portion 125 thereby curving back on itself to create the clamping action. A plurality of locking teeth 115 are provide to grip and lock solar panel frame 140 in place. A clamp lip 135 is provided to aid in inserting solar panel frame 140 therein. Slide portion 110 terminates in a stop portion 120.

Locking teeth 115 are integrally formed in slide-on clip 100 by deforming a portion along an outside edge of both the top and bottom of clamp portion 125. Although in the embodiment shown, four locking teeth 110 on each side are shown, it is understood that more or less locking teeth 115 may be used. Slide-on clamp 100 is formed from metal that is hardened to resiliently clamp on solar panel frame 140 portion that is inserted within clamp portion 125.

Slide portion 110 has a slot 130 that allows an installer to position solar panel frame 140 on a solar panel mounting base 145 using an attachment bolt 150. Attachment bolts 150 are attached to solar panel mounting bases 145. Because solar panel frame 140 locks into place within slide-on clamp 100, the installer is able to attach the panel from the top without having to access the bottom side. This makes installation much easier and more efficient.

Figure 6:
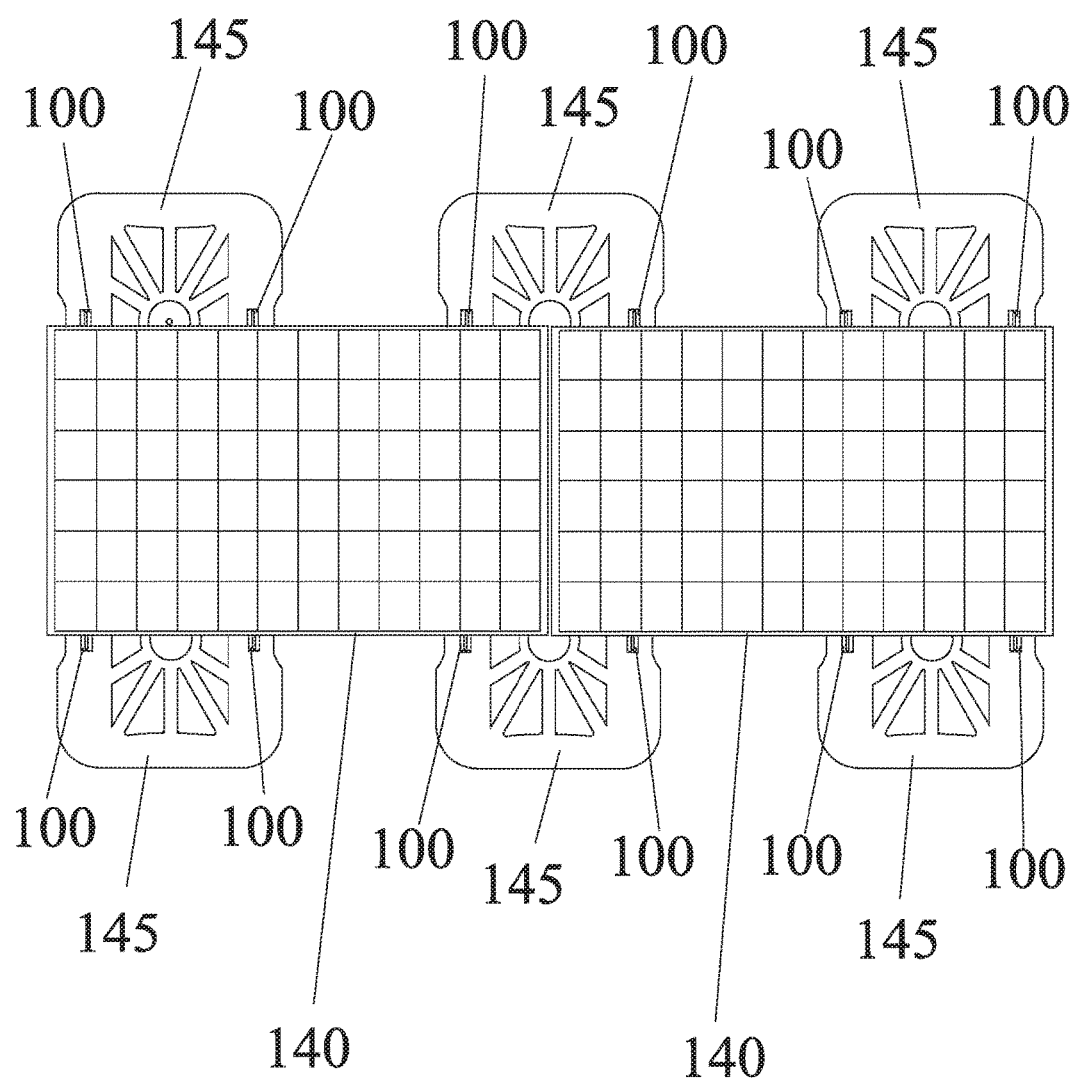
FIG. 6 is a top view of a typical multi-panel installation using slide-on clips for installing solar panels according to an embodiment of the invention.

During installation, a plurality of solar panel mounting bases 145 are arranged to provide an angled attachment surface that will align an attached solar panel at an appropriate angle to maximize solar radiation. In general, at least four solar panel mounting bases 145 are used for an installation. Each base 145 can support two adjacent solar panel frames to provide for multi-panel installations as shown in FIG. 6. Slide-on clip 100 attaches to solar panel frame 140 and is fastened to an attachment portion provided on solar panel mounting base 145 using attachment bolt 150 as discussed above allowing the installer to completely secure the solar panels from the top side only allowing a blind installation.

Although the instant invention has been described in relation to particular embodiments thereof, many other variations and modifications and other uses wall become apparent to those skilled in the art.

What is claimed is:

1. A slide-on clamp for solar panel installation comprising:
    a single slide portion;
    said single slide portion having a slot portion centrally aligned thereon; wherein said slide-on clamp is selectively positionable along a direction parallel to said single slide portion;
    a clamp portion disposed on an end of said single slide portion;
    said clamp portion having a bent portion with reverse curve portion;
    said reverse curve portion having a radius of more than 180 degrees wherein a resilient clamp portion is defined;
    said reverse curve portion having an upper portion and a lower portion;

said upper portion having a length less than said lower portion;

a plurality of inward facing locking teeth disposed on an upper interior surface and a lower interior surface of said reverse curve portion; and a stop portion disposed on an opposite end of said single slide portion.

2. The slide-on clamp for solar panel installation of claim 1 further comprising a lip portion disposed on said upper portion for guiding a solar panel frame within said reverse curve portion.

3. The slide-on clamp for solar panel installation of claim 1 wherein said slide-on clamp is made of metal.

4. The slide-on clamp for solar panel installation of claim 1 wherein said plurality of inward facing locking teeth are integrally formed therein.

5. A method of installing solar panels comprising the steps of:

placing solar panel mounting bases on a surface where said solar panels are to be mounted;

obtaining at least four slide-on clamps wherein each of said slide-on clamps comprising:

a single slide portion;

said single slide portion having a slot portion centrally aligned thereon; wherein said slide-on clamp is selectively positionable along a direction parallel to said single slide portion;

a clamp portion disposed on an end of said single slide portion;

said clamp portion having a bent portion with reverse curve portion;

said reverse curve portion having a radius of more than 180 degrees wherein a resilient clamp portion is defined;

said reverse curve portion having an upper portion and a lower portion;

said upper portion having a length less than said lower portion;

a plurality of inward facing locking teeth integrally formed and disposed on an upper interior surface and a lower interior surface of said reverse curve portion;

a stop portion disposed on an opposite end of said single slide portion;

inserting said slide-on clamps along two opposing outer perimeter edges of a solar panel frame; wherein said slide-on clamps are accessible from a top portion of said solar panel mounting bases;

locating said slide-on clamps on an attachment bolt disposed on each of said solar panel mounting bases;

placing a nut over each of said attachment bolt located on said top portion of said solar panel mounting bases; and tightening each of said nut to secure said slide-on clamps to said solar panel mounting base.

* * * * *